Jan. 12, 1954  H. HORLACHER  2,665,613
OVERARM DEFLECTION COMPENSATOR
Filed Oct. 13, 1951
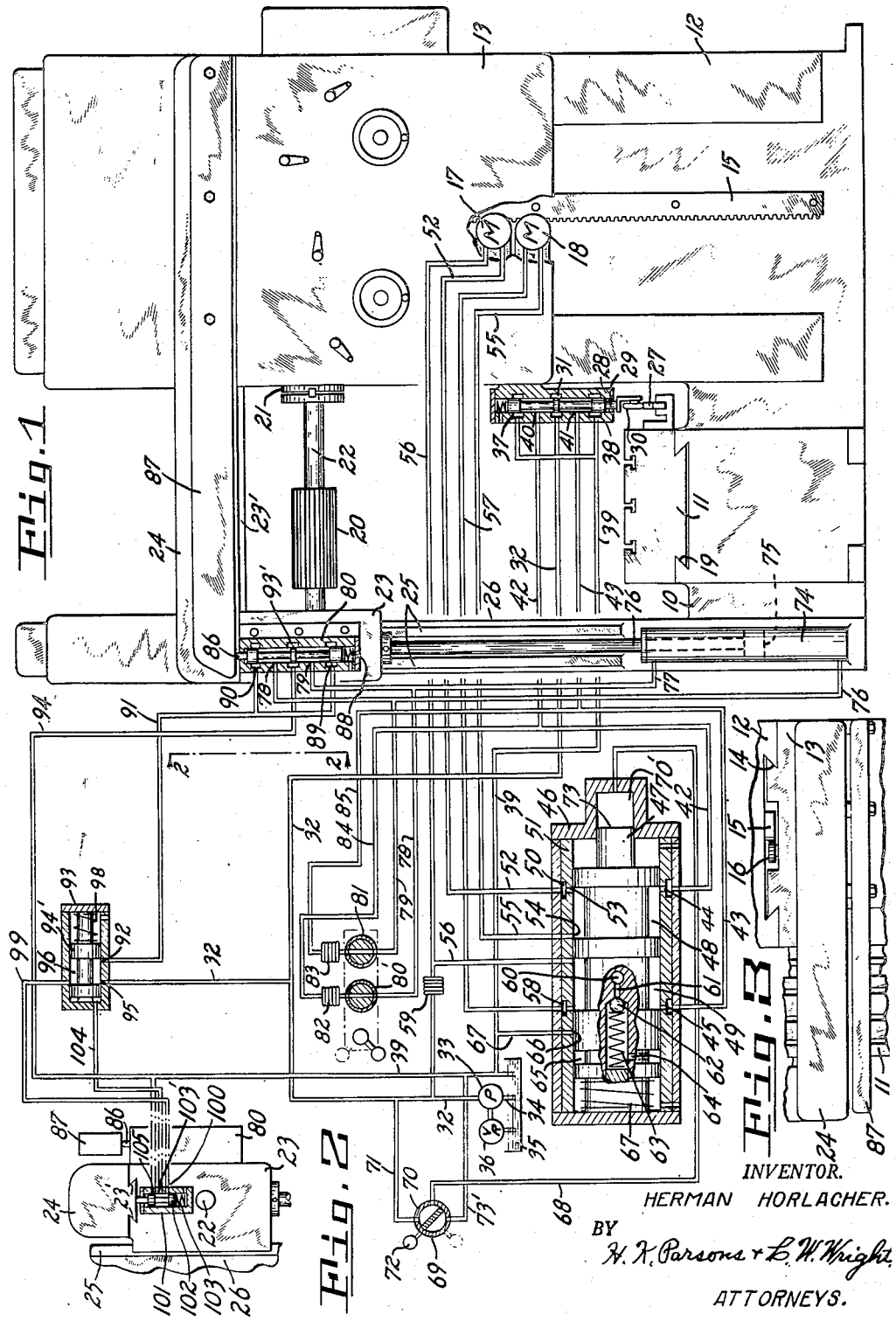
INVENTOR.
HERMAN HORLACHER.
BY
H. K. Parsons + E. W. Wright
ATTORNEYS.

Patented Jan. 12, 1954

2,665,613

UNITED STATES PATENT OFFICE 2,665,613

OVERARM DEFLECTION COMPENSATOR

Herman Horlacher, Cincinnati, Ohio, assignor to The Cincinnati Milling Machine Co., Cincinnati, Ohio, a corporation of Ohio Application October 13, 1951, Serial No. 251,239

9 Claims. (Cl. 90—20.5)

This invention relates to machine tools, such as milling machines and the like, which utilize an overarm supporting structure for a tool spindle, and more particularly to automatic mechanism for reducing or preventing deflection of the overarm under excessive cutting load conditions.

In principle, the invention comprises an automatic overarm deflection detecting device which is operatively connected to cause a power means to apply the necessary force to the overarm in a direction opposite to a deflection causing force acting thereon and thus maintain the overarm in its normal position and thereby hold the cutting tool in its desired working position relative to the work.

One of the objects of this invention is to improve the construction of overarm type machine tools so as to maintain parallelism at all times under abnormal working conditions between the axis of the tool and the desired work surface being produced.

Another object of this invention is to provide a new and improved overarm deflection compensating mechanism for automatically neutralizing deflection of the overarm under excessive load conditions.

A further object of this invention is to provide in conjunction with an overarm carrying rise and fall spindle carrier of a machine tool, an automatic mechanism for correcting deflection of the overarm caused by excessive cutting load conditions regardless of the vertical position of the carrier.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a view partly diagrammatic illustrating one embodiment of the invention.

Figure 2 is an end view of the overarm as viewed on the line 2—2 of Figure 1.

Figure 3 is a plan view of the overarm and its mounting on the spindle carrier.

Referring to the drawings, there is shown in Figure 1 a type of machine tool, to which this invention is particularly adaptable, in the form of a milling machine having a bed 10, a reciprocating work supporting table or platen 11, and a column 12 upon which is slidably mounted a spindle carrier 13. The spindle carrier 13 is supported as by means of dovetailed guideways 14, shown in Figure 3, on the column 12. Vertical movement is imparted to the carrier by means of a rack bar 15 which is attached to the column 12, and rack pinions, one of which is shown at 16 in Figure 3, are mounted in the carrier and driven by rotary hydraulic motors 17 and 18 diagrammatically illustrated in Figure 1.

The work supporting table 11 is slidably mounted on dovetailed guideways 19 on the bed 10. Suitable power operable means, not shown, may be utilized for reciprocating the table relative to a cutting tool 20. The cutting tool is driven by a spindle 21 which is suitably journaled in the carrier 13 for actuation by suitable power operable means mounted in the carrier. The cutter is supported in the usual manner on a cutter arbor 22 which has one end secured in the cutter spindle 21, and the other end journaled in an arbor support indicated generally by the reference numeral 23 as shown in Figure 2. The arbor support 23 is mounted on dovetailed guideways 23' for support by the overarm 24 and is supported by the same guideways 23' to the top of the carrier 13 for longitudinal adjustment with respect thereto.

The overarm may be suitably clamped in the spindle carrier by conventional means after adjustment and set-up of the machine. It will now be apparent that the overarm is securely clamped at one end in the spindle carrier and projects over the work support with sufficient rigidity to support the outer end of the cutter arbor against movement under ordinary cutting conditions. However, if the load or upward thrust on the cutter 29 during working contact with a work piece becomes excessive or abnormal and overcomes the rigidity of the overarm and deflects the same the cutter arbor 22 will be thrown out of parallelism with the surface being produced, whereby the finished surface will be distorted. It has been found that under certain abnormal operating conditions the end of the overarm will deflect as much as $\frac{1}{16}$ to $\frac{3}{32}$".

In this machine the spindle carrier is operated as a rise and fall carrier and therefore when the carrier is moved, the overarm and the arbor support must be moved with it in order to properly support the cutter arbor. Therefore, means have been provided for guiding the arbor support 23 for vertical movement by mounting it on dovetailed guideways 25 formed on a vertical upright 26 which is attached to the front of the bed as shown in Figure 1.

The power means for effecting the rise and fall will first be described, and in the embodiment shown the rise and fall of the spindle carrier is automatically controlled in accordance with a template 27 which is suitably secured or attached to the side of the table 11, and a servo-control valve 28 is secured to the carrier 13. The valve plunger 29 of this valve has a feeler roller 30 secured to the end of the valve plunger for engagement with the edge of the template 27. The servo-valve 28 has a pressure port 31 which is connected by conduit 32 to the delivery side of a pump 33 which has an intake 34 for withdrawing fluid from a reservoir 35. A suitable relief valve 36 is operatively connected to the output of the pump.

The servo-valve also has a pair of exhaust ports 37 and 38 which are connected to a common return line 39 which extends to the reservoir 35 for returning exhaust fluid thereto. In addition, the servo-valve has a pair of motor ports 40 and 41 which are connected by channels 42 and 43 which lead to ports 44 and 45 of a selector valve 46 which is so constructed and connected as to determine whether the hydraulic motors 17 and 18 will be operated in series or in parallel. In some cases it is more desirable to operate the motors in parallel as for fast operation, and at other times it is more desirable to operate them in series. The valve plunger 47 of the valve 46 has two annular grooves 48 and 49 which in the position shown of the plunger connects hydraulic motors 17 and 18 to the control lines 42 and 43 in parallel. In other words, if the line 42 is under pressure, the fluid will flow around the annular groove 50 in the valve sleeve 51 to motor line 52 leading to the hydraulic motor 17, and also through the porting 53, annular groove 48 and porting 54 to line 55, leading to the hydraulic motor 18. The remaining motor lines 56 and 57 would return the fluid to the annular groove 49 and thereby to line 43 and thus be returned by the common line 39 to reservoir.

When the valve plunger 47 is shifted to its extreme right hand position and, assuming line 42 to be under pressure, the fluid would flow through the annular groove 50 to the motor line 52 to motor 17, and be returned therefrom through line 56 to the annular groove 49 which would then be in a position to direct the flow through motor line 55 to motor 18, and the returning fluid would pass around the annular groove 58 to port 45 and line 43.

It will be noted that line 56 is the intermediate line between the two motors which means that if the second motor does not run at the same speed as the first motor and does not consume the same amount of oil, the line 56 will either have pressure built up in it, or it will be starved of fluid and, to take care of either condition, the line 56 is connected by a resistance 59 to the pump pressure line 32, through which resistance fluid pressure will flow if the line 56 becomes starved. If excessive pressure builds up in the line 56 it will be communicated through the cross bore 60 in the valve plunger 47 from the annular groove 49 and then through an axial bore 61 to a relief valve 62.

The chamber 63 of the relief valve is connected by a radial bore 64 to an annular groove 65 formed in the valve plunger 47, and this annular groove is at this time in communication with an exhaust port 66 which is connected by a branch line 67 to the exhaust line 39.

The valve plunger 47 is normally held in its right hand position by a spring 67 mounted within the valve housing between the end of the valve plunger and the end of the housing. The plunger is shifted to the left by admitting pressure to line 68 through the means of a manual selector valve 69 which has a pressure port 70 connected by channel 71 to the output of the pump 33. The fluid pressure in line 68 will enter chamber 70' of the valve 46 and act on the reduced end 73 of the valve plunger. By rotating the valve 69 by means of the handle 72, the line 68 may be connected to the reservoir line 73'.

It will now be seen that, as the work table 11 is moved through a cutting stroke, the template 38, acting through the servo-valve, will effect the necessary rotation of the hydraulic motors 17 and 18 to raise or lower the spindle carrier as the demands of the template require. The arbor support 23 must also be raised and lowered, and this is accomplished by providing a cylinder 74 attached to the upright 26 and containing a piston 75 which is connected by a piston rod 76 to the underside of the arbor support 23. The cylinder 75 has a pair of conduits 76 and 77 connected to opposite ends thereof which lead to ports 78 and 79 of a control valve 80. The lines 76 and 77 have branch connections 78 and 79 which lead to shut-off valves 80' and 81 respectively.

When these valves are open, as shown, the lines 78 and 79 are connected by hydraulic resistances 82 and 83 to lines 84 and 85. It will be noted that the lines 84 and 85 are branch connected to the two motor lines 42 and 43 leading from the servo-valve 28. Thus, when the valves 80' and 81 are open, the servo-valve not only controls the flow of fluid pressure to the hydraulic motors 17 and 18 to raise and lower the spindle carrier 13, but at the same time directs fluid pressure to the cylinder 74 to apply pressure to raise and lower the arbor support 23. Thus, the same pressure would be applied to raise the spindle carrier as to raise the arbor support minus the reduction in pressure caused by the flow through the resistances 82 or 83. The point, however, is that the pressure to each would be simultaneously varied in the same ratio, and they could not be differentiated.

It has been found that the axial position of the cutter 20 on the arbor 22 varies the loading at each end of the arbor support 22 with the result that the outboard end of the arbor for the same pressure conditions might be raised or might be lowered with respect to its normal position, depending upon the load conditions. To correct for this and to compensate for deflections of the overarm, a control valve 80 has been provided in the arbor support 23. The valve plunger 86 of this valve engages an independent fixed member 87 which is in the form of an arm projecting from the spindle carrier 13 parallel with the overarm but in spaced relation thereto.

The arm 87 is attached to the spindle carrier and is sufficiently rigid to have no deflection, and furthermore is not under any load or responsive to any load imparted to the overarm 24. Therefore, the end of the overarm, when deflected, moves independently and relatively to the end of the arm 87. Furthermore, by the arm 87 holding the valve plunger 86 fixed in space by virtue of the spring 88 holding the valve plunger against the underside of the arm 87, the valve body 80 will move up or down relative to the valve plunger and the arm 87. The ports constitute an overarm deflection detecting mechanism. The valve body has a pair of pressure ports 89 and 90 which are connected to a common channel 91 that extends to port 92 of an interlock control valve 93. When the valve plunger 94' of this valve is in the position shown, the port 92 is connected to the port 95 by the annular groove 96 in the plunger 94'. The port 95 is connected to the pump supply line 32. The valve 80 also has an exhaust port 93' which is connected by channel 94 to the reservoir 35. It will now be apparent that if the overarm 24 deflects relative to the detector arm 87 that fluid pressure will be admitted to either the channel 76 or the channel 77 and thereby apply pressure to one side or the other of piston 75 which will apply a force on the overarm in a direction opposite to the deflective force and thereby prevent deflection of the overarm.

There will be times, of course, when the overarm will be retracted and not used, which means that the detector arm 87 will be retracted with it, which would allow the valve plunger 86 to move to the end of the valve housing and cause full pressure on piston 75. It is desirable, therefore, that fluid pressure be disconnected from the valve pressure ports and therefore an interlock valve 93 is provided. The valve plunger 94' of this valve is normally held in its left hand position by a spring 98, but, even so, the annular groove 96 will connect the pressure port 95 to a line 99 which extends to port 100 of a safety valve 101. This valve has a plunger 102 which is normally urged upward by a spring 103 but held down against the urge of the spring by the overarm 24 when it is in its extended position. When held down in this manner, the port 100 is connected to port 103' so that fluid pressure enters the line 104 and acts on the end of the valve plunger 94' to hold it in its right hand position in which it is shown. When the overarm 24 is retracted, the valve plunger 102 moves upward, closing the pressure port 100 and connecting port 103' to exhaust port 105 which leads to the return line 94. Thus, as soon as the overarm is retracted the safety valve causes operation of the interlock valve 93 to disconnect fluid pressure from the detecting valve 80.

In this invention, it will be noted that separate hydraulically operable means are provided at each end of the overarm for pushing it up and down to insure that it remains parallel to the surface of the table. These separate hydraulic means, one of which is the motor means that moves the carrier, and the other, the piston 75 in the cylinder 74 connected to the outboard end of the overarm are in effect connected in parallel to the servo-control valve 28, so that they will be moved simultaneously, thereby preventing misalignment of the overarm. Since the piston 75 is a differential piston, the resistances 82 and 83 are differentiated in their value to take care of this. At the same time, the piston 75 is under control of the valve 80 whereby any misalignment of the overarm and its supported spindle arbor, either while the parts are stationary or moving, will be automatically corrected.

It will be obvious that the arm 87 could be attached directly to the spindle carrier, but since it would interfere when a high work piece was placed on the table and the overarm was retracted because not needed, it is more convenient to attach it to the end portion of the overarm that is solidly held in the carrier.

What is claimed is:

1. In a pendant for a machine tool overarm supported at one end in a fixed part of the machine, a housing having bearing means for rotatably supporting the outboard end of a cutter arbor also supported at one end in a fixed part of the machine, means attaching the housing to the outboard end of the overarm whereby the overarm will support the free end of the cutter arbor against deflective movement under cutting loads, auxiliary means including a control member slidably mounted for relative movement in the housing, a rigid member mounted on the machine in engagement with said control member for holding it against movement with said housing, and power operable means effective in response to relative movement between the housing and control member for applying an auxiliary force to said overarm opposing a deflective force thereon.

2. In a pendant for a machine tool overarm supported at one end in a fixed part of the machine, a housing having bearing means for the outboard end of a cutter arbor also supported at one end in a fixed part of the machine, and means attaching the housing to the outboard end of the overarm for supporting the free end of the cutter arbor against deflective movement under cutting loads, auxiliary means for preventing movement of the housing including a control valve member slidably mounted in the housing, a rigid member carried by the machine, resilient means for maintaining the control valve member in engagement with said rigid member, and power operable means including a piston and cylinder hydraulically connected to said control valve member for response to relative movement between the housing and the control valve member for applying an auxiliary force to said housing in opposition to a deflective force thereon.

3. In a pendant for a machine tool overarm mounted at one end on a spindle carrier of a machine tool, a pendant housing, bearing means in the housing for the outboard end of a cutter arbor, the other end of which is supported by said carrier, and means attaching the housing to the outboard end of the overarm whereby the overarm supports the pendant and the cutter arbor against deflective movement under cutting loads, the combination of separate means for guiding the spindle carrier and the housing for vertical parallel movement, separate hydraulic means for shifting the spindle carrier and the housing including a piston and cylinder for shifting said housing, valve means carried by the housing and hydraulically connected to said piston and cylinder, a rigid member supported by the overarm at the carrier end thereof and extending parallel to said overarm into engagement with said valve means to hold the same against movement upon relative movement between the housing and said member whereby relative movement between the housing and control valve member will connect fluid pressure to said piston and cylinder to oppose deflective forces acting on the housing.

4. In a pendant for a machine tool overarm comprising a housing having bearing means for the outboard end of the cutter arbor of the machine, and means attaching the housing to the outboard end of the overarm for supporting the end of the cutter arbor against deflective movement under cutting loads, the combination of auxiliary means including a control valve member mounted for relative movement in the housing, a rigid member attached to the supported end of the overarm and extending parallel thereto in engagement with said valve member, said valve member having a source of pressure connected thereto, a fluid operable motor supported by the machine and operatively connected to said housing, hydraulic connections from said valve to said hydraulic motor whereby relative movement between said valve member and said housing will cause said motor to exert an auxiliary force on said housing in opposition to a deflective force thereon, and an interlock valve carried by said housing including a plunger normally in engagement with said overarm whereby disconnection of said overarm from said housing will cause actuation of said valve, and means operable by said interlock valve for disconnecting said source of pressure from said control valve.

5. In a pendant for a machine tool overarm mounted in a spindle carrier of a machine tool, a pendant housing, bearing means in the housing for the outboard end of a cutter arbor, the other end of which is supported by said carrier, and means attaching the housing to the outboard end of the overarm whereby the overarm supports the pendant and the cutter arbor against deflective movement under cutting loads, the combination of separate means for guiding the spindle carrier and the housing for vertical parallel movement, separate hydraulic means for shifting the spindle carrier and housing, a common control valve having a source of pressure connected thereto and operable to connect pressure simultaneously to each of said hydraulic means, and additional control valve means operable to connect pressure to one of said hydraulic means upon uneven movement thereof with respect to the other hydraulic means.

6. A milling machine having an overarm supported at one end, a cutter arbor supporting pendant attached to the other end of said overarm, a fixed cylinder having a piston operatively connected to said pendant, a control valve mounted in said pendant and operable to connect fluid pressure alternatively to opposite sides of said piston, said valve including a valve plunger normally urged in one direction, and a rigid member attached to the supported end of said overarm and extending parallel thereto into engagement with said valve plunger for normally limiting movement thereof to a position disconnecting pressure from both ends of said cylinder whereby relative movement of the pendant and overarm with respect to said member will cause operation of said valve.

7. In a milling machine having an overarm supported at one end, and a cutter arbor supporting pendant attached to the other end of said overarm, the combination of a piston and cylinder, one of which is fixed to the machine and the other operatively connected to said pendant, a control valve mounted in said pendant and having a source of pressure connected thereto, said valve including a valve plunger, resilient means normally urging the plunger in one direction, and a rigid member connected to the supported end of the overarm and extending in parallel and spaced relation thereto into engagement with said valve plunger for normally positioning the same to disconnect said source of pressure from both ends of said cylinder whereby relative movement of the pendant and overarm with respect to said member will cause said valve to connect said source of pressure to one end of said cylinder.

8. In a milling machine having a spindle carrier, an overarm supported at one end in said carrier, and a cutter arbor supporting pendant attached to the free end of said overarm, the combination of a piston and cylinder, one of which is fixed and the other operatively connected for moving said pendant and overarm, a control valve mounted in said pendant and having a source of pressure connected thereto, fluid channels connecting said control valve to opposite ends of said cylinder, a valve plunger slidably mounted in said valve, resilient means normally urging said valve plunger in one direction, and a rigid member attached to the supported end of the overarm and extending parallel to and in spaced relation to said overarm into engagement with said valve plunger and positioning the same to disconnect said source of pressure from both ends of said cylinder whereby relative movement of the pendant and overarm with respect to said member will effect connection of pressure to one of said channels.

9. A milling machine having an overarm supported at one end, a cutter arbor supporting pendant attached to the other end of said overarm, a fixed cylinder having a piston operatively connected to said pendant, a control valve mounted in said pendant for connecting fluid pressure alternatively to opposite sides of said piston, said valve including a valve plunger normally urged in one direction and a rigid member attached to the supported end of said overarm and extending parallel thereto into engagement with said valve plunger for normally limiting movement thereof to a position disconnecting pressure from both ends of said cylinder whereby relative movement of the pendant and overarm with respect to said member will cause operation of said valve, and a second valve mounted on said pendant having a plunger in engagement with said overarm, a source of pressure connected thereto, and means operable by said second valve while in engagement with said overarm for maintaining a fluid pressure connection to said first-named valve.

HERMAN HORLACHER.

References Cited in the file of this patent
UNITED STATES PATENTS

| Number | Name | Date |
|---|---|---|
| 2,040,755 | Meyer | May 12, 1936 |
| 2,068,889 | Roehm et al. | Jan. 26, 1937 |
| 2,260,093 | Blood | Oct. 21, 1941 |
| 2,369,598 | Misset | Feb. 13, 1945 |